United States Patent [19]
Cowley

[11] Patent Number: 5,997,024
[45] Date of Patent: Dec. 7, 1999

[54] HITCH MECHANISM

[75] Inventor: Daniel Joseph Cowley, Waterloo, Iowa

[73] Assignee: Deere & Company, Moline, Ill.

[21] Appl. No.: 09/056,677

[22] Filed: Apr. 7, 1998

[51] Int. Cl.⁶ .................................................. A01B 63/102
[52] U.S. Cl. ...................... 280/478.1; 172/605; 172/471; 172/439
[58] Field of Search .................................... 280/504, 477, 280/406.1, 491.1, 491.2, 478.1; 172/605, 467, 471, 677, 684.5, 439, 442; 37/231

[56] References Cited

U.S. PATENT DOCUMENTS

| | | | |
|---|---|---|---|
| 2,762,284 | 9/1956 | Fraga | 97/47.53 |
| 3,425,715 | 2/1969 | Weitz . | |
| 3,432,184 | 3/1969 | Tweedy | 280/479 |
| 3,530,943 | 9/1970 | Taylor . | |
| 4,059,283 | 11/1977 | Shelton . | |
| 4,125,271 | 11/1978 | Wiboltt et al. . | |
| 4,231,432 | 11/1980 | Jennings . | |
| 4,360,216 | 11/1982 | Weimers . | |
| 4,564,073 | 1/1986 | Ide et al. . | |
| 4,640,365 | 2/1987 | Schmidt . | |
| 4,835,691 | 5/1989 | Rotem et al. . | |
| 4,930,581 | 6/1990 | Fleischer et al. . | |
| 5,092,409 | 3/1992 | Defrancq . | |
| 5,195,261 | 3/1993 | Vachon | 37/231 |
| 5,201,539 | 4/1993 | Mayfield . | |
| 5,697,454 | 12/1997 | Wilcox et al. | 172/439 |
| 5,823,270 | 10/1998 | Cooper | 172/439 |

FOREIGN PATENT DOCUMENTS

| | | | |
|---|---|---|---|
| 2698517 | 6/1994 | France | 172/439 |

OTHER PUBLICATIONS

Wilcox Agri–Products, "3–Point Hitch for Challenger Tractors" four pages of marketing literature, no publication date.
Duncan and Wegscheid, "Off–Road Vehicle Simulation for Human Factors Research" ASAE Paper No. 82–1610, Dec. 14–17 1982.
Motion Systems Corporation,"Additional Ball Drive Actuators and Ball Screws", http://www.motionsystem.com/addball.htm, publication dated unknown –printout date Mar. 20, 1998.
University of Leeds, "EPSRC–Linear Variable Reluctance Actuator", http://www.elec–eng.leeds.ac.uk/emd/lsrd/lsrd.html, publication date unknown–printout dated Mar. 20, 1998.
Power Transmission Home Page, "Linear Motion Devices", http://www.powertransmission.com/prod/linear.htm, 1997.
Sunco, "Acura Trak Guidance Control" .
Sukup, "Guidance System–Autoguide" .
Orthman, "MP–III Tracker" .
HR Manufacturing, "Navigator Row Crop Guidance System" .
Fleischer Manufacturing, Inc., "Scout–The Ultimate Guidance System..." .
Lincoln Creek Manufacturing Co., "The Guide–Quick Hitch".
Orthman Manufacturing, Inc., "Orthman Computerized Quick Hitch Guidance System" .

*Primary Examiner*—Lanna Mai
*Assistant Examiner*—Avraham H. Lerner

[57] ABSTRACT

A hitch mechanism includes a coupler frame supporting a plurality of coupler devices for coupling with an implement. A fixed length link and three variable length links are attached to the coupler frame, has a first end pivotally coupled to the vehicle and a second end pivotally coupled to a central part of the coupler frame. Three variable length links, each variable length link having a first end pivotally coupled to the vehicle and a second end pivotally coupled to the coupler frame. The three variable length links preferably extend generally parallel to each other and are spaced apart in a triangular array, and the fixed length link is positioned near the center of the array. The three variable length links include an upper link and left and right lower links. The three variable length links are preferably hydraulic cylinders which can be extended and retracted.

6 Claims, 1 Drawing Sheet

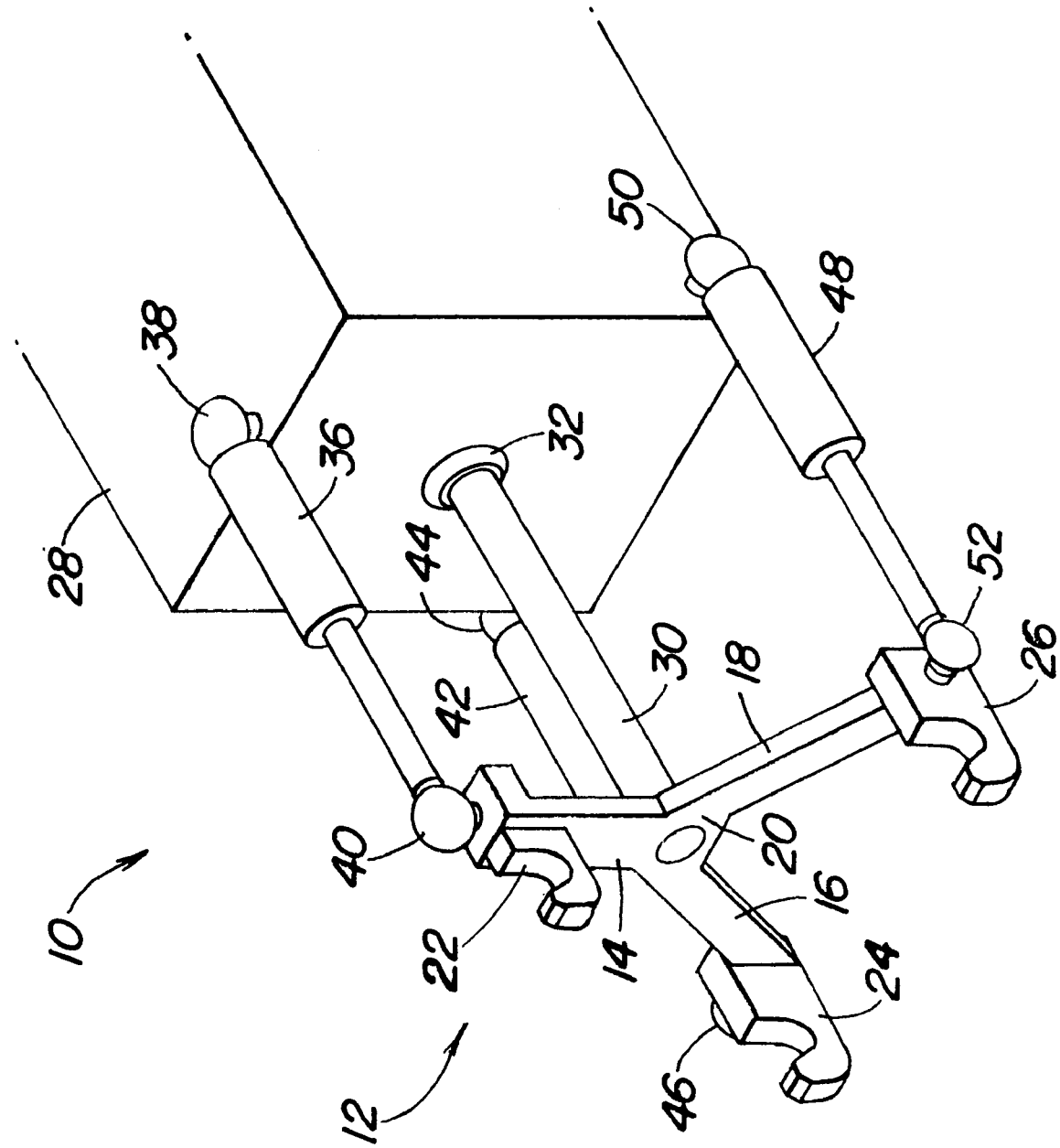

HITCH MECHANISM

ASSIGNMENT

The entire right, title and interest in and to this application and all subject matter disclosed and/or claimed therein, including any and all divisions, continuations, reissues, etc., thereof are, effective as of the date of execution of this application, assigned, transferred, sold and set over by the applicant(s) named herein to Deere & Company, a Delaware corporation having offices at Moline, Ill. 61265, U.S.A., together with all rights to file, and to claim priorities in connection with, corresponding patent applications in any and all foreign countries in the name of Deere & Company or otherwise.

BACKGROUND OF THE INVENTION

The invention relates to a hitch assembly for coupling between an implement and an agricultural vehicle, and in particular a track-laying agricultural vehicle.

Various hitch mechanisms are available to connect an agricultural implement to an agricultural vehicle. One such known hitch mechanism is the conventional three-point hitch mechanism. However, conventional three-point hitches do not provide an implement steering function. There exists row guidance mechanisms (Acura-Trak) which provide an implement steering function, but such mechanisms do not provide a lateral shifting capability. A mechanism available from Wilcox includes an assembly which pivots about a vertical pin and therefore also do not provide a lateral shifting capability. This mechanism is described in U.S. Pat. No. 5,697,454, issued Dec. 16, 1997 to Wilcox et al. There also exist row guidance mechanisms, such as the "Navigator", which provides a lateral shifting function, but not an implement steering function. Accordingly, it would be desirable to provide a hitch mechanism which has both an implement steering function and a lateral shifting capability. It is believed that a tracked agricultural vehicle would especially benefit from a having a hitch which could both steer and laterally shift an implement, so as to reduce lateral forces which the implement would otherwise transmit to the vehicle.

SUMMARY OF THE INVENTION

Accordingly, an object of this invention is to provide a hitch mechanism which has both an implement steering function and a lateral shifting capability.

This and other objects are achieved by the present invention, wherein a hitch mechanism includes a coupler frame supporting a plurality of coupler devices for coupling with an implement. A fixed length link has a first end pivotally coupled to the vehicle and a second end pivotally coupled to the coupler frame. Preferably three variable length links, each variable length link having a first end pivotally coupled to the vehicle and a second end pivotally coupled to the coupler frame. The three variable length links preferably extend generally parallel to each other and are spaced apart in a triangular array, and the fixed length link is positioned near the center of the array. The three variable length links include an upper link and left and right lower links. The three variable length links are preferably hydraulic cylinders which can be extended and retracted.

BRIEF DESCRIPTION OF THE DRAWINGS

The sole Figure is a perspective view of a hitch mechanism according to the present invention.

DESCRIPTION OF THE PREFERRED EMBODIMENT

Referring to FIG. 1, the hitch mechanism 10 includes a coupler frame 12 which includes three frame members 14, 16 and 18 which are fixed to and extend away from a central hub 20. The outer end of frame member 14 supports a center upper coupling device 22. The outer end of frame member 16 supports a lower left coupling device 24. The outer end of frame member 18 supports a lower right coupling device 26. The coupling devices 22–26 are preferably conventional coupling devices such as are found on conventional commercially available three-point hitch mechanisms. A base 28 is provided for mounting on the rear end of the vehicle (not shown). A fixed length link 30 has a first end pivotally coupled to the base 28 via a conventional ball and socket pivot 32 and a second end pivotally coupled to the hub 20 via a ball and socket pivot which is hidden from view in FIG. 1.

A first variable length link 36 has a first end pivotally coupled to the base 28 via a ball and socket pivot 38 and a second end pivotally coupled to the outer end of link 14 via a ball and socket pivot 40. A second variable length hydraulic cylinder link 42 has a first end pivotally coupled to the base 28 via a ball and socket pivot 44 and a second end pivotally coupled to the outer end of link 16 via a ball and socket pivot 46. A third variable length hydraulic cylinder link 48 has a first end pivotally coupled to the base 28 via a ball and socket pivot 50 and a second end pivotally coupled to the outer end of link 18 via a ball and socket pivot 52. By controlling the lengths of the cylinders 36, 42 and 48 the coupler frame 12 may be shifted and translated without rotating, it may be rotated about an axis, or it may be both rotated and shifted and translated. The fixed length link 30 would function primarily to absorb draft forces so that smaller draft forces would have to be carried by the cylinder links 36, 42 and 48. Preferably, the links 36, 42 and 48 are hydraulic cylinders, however, other types of variable length links could also be used. For example, such other variable length actuators include pneumatic actuators, commercially available ball and screw actuators, such as made by Motion Systems Corporation (see world wide web site www.motionsystem.com/addball.htm), or reluctance linear actuators such as described at http://www.elec-eng.leeds.ac.uk/emd/lsrd/lsrd.html. Other variable length links are described at world wide web site http://www.powertransmission.com/prod/linear.htm.

While the present invention has been described in conjunction with a specific embodiment, it is understood that many alternatives, modifications and variations will be apparent to those skilled in the art in light of the foregoing description. For example, the coupler frame could be formed out of a solid triangular plate instead of a plurality of frame members. Accordingly, this invention is intended to embrace all such alternatives, modifications and variations which fall within the spirit and scope of the appended claims.

What is claimed is:

1. A hitch mechanism for coupling between an implement and an agricultural vehicle, the hitch mechanism comprising:

a coupler frame supporting a plurality of coupler devices for coupling with an implement;

a fixed length link having a first end adapted to be pivotally coupled to the vehicle and a second end pivotally coupled to the coupler frame; and at least three variable length links, each variable length link having a first end pivotally adapted to be coupled to the vehicle and a second end pivotally coupled to the coupler frame, said three variable length links extending generally parallel to each other and being spaced apart in a triangular array, and the fixed length link being positioned near the center of the array, the three variable length links each comprising a hydraulic cylinder which can be extended and retracted.

2. The hitch mechanism of claim 1, wherein:

the three variable length links comprise an upper link and left and right lower links.

3. The hitch mechanism of claim 1, wherein:

the coupler frame comprises a central hub and a plurality of frame members which extend outwardly from the hub.

4. The hitch mechanism of claim 3, wherein:

each frame member has an outer end pivotally coupled to a corresponding one of the variable length links.

5. The hitch mechanism of claim 3, wherein:

each frame member has an outer end supporting a corresponding coupler device.

6. The hitch mechanism of claim 3, wherein:

the hub is pivotally coupled to the fixed length link.

\* \* \* \* \*